United States Patent
Jeong et al.

(10) Patent No.: US 11,402,114 B2
(45) Date of Patent: Aug. 2, 2022

(54) SMART AIR PURIFIER SYSTEM WITH FIRST AND SECOND AIR PURIFIERS AND METHOD FOR CONTROLLING THE SAME

(71) Applicant: LG ELECTRONICS INC., Seoul (KR)

(72) Inventors: Jaewoong Jeong, Seoul (KR); Sangjun Oh, Seoul (KR); Youngman Kim, Seoul (KR); Kyuho Lee, Seoul (KR); Seunghyun Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 525 days.

(21) Appl. No.: 16/572,475

(22) Filed: Sep. 16, 2019

(65) Prior Publication Data

US 2020/0011563 A1 Jan. 9, 2020

(30) Foreign Application Priority Data

Jun. 27, 2019 (KR) .......................... 10-2019-0077201

(51) Int. Cl.
*F24F 11/49* (2018.01)
*G05B 15/00* (2006.01)
*F24F 3/167* (2021.01)

(52) U.S. Cl.
CPC .............. *F24F 11/49* (2018.01); *F24F 3/167* (2021.01); *G05B 15/00* (2013.01); *G05B 2219/2642* (2013.01)

(58) Field of Classification Search
None
See application file for complete search history.

(56) References Cited

U.S. PATENT DOCUMENTS

| 2005/0155366 A1* | 7/2005 | Kim ......................... F24F 11/30 |
| | | 62/186 |
| 2005/0172816 A1* | 8/2005 | Son ..................... B01D 46/0028 |
| | | 96/417 |

(Continued)

FOREIGN PATENT DOCUMENTS

| JP | 2018132246 | 8/2018 |
| KR | 1020130044007 | 5/2013 |

(Continued)

OTHER PUBLICATIONS

Korean Intellectual Property Office Application No. 10-2019-0077201, Office Action dated Oct. 27, 2020, 6 pages.

(Continued)

*Primary Examiner* — Bernard G Lindsay
(74) *Attorney, Agent, or Firm* — Lee Hong Degerman Kang & Waimey

(57) ABSTRACT

Disclosed is a method for controlling a smart air purifier, the method including: obtaining first air cleanliness of a first area in which a first air purifier is placed, and obtaining second air cleanliness of a second area in which a second air purifier is placed; when at least one of the first air cleanliness or the second air cleanliness is equal to or smaller than a preset threshold value, driving both the first air purifier and the second air purifier; monitoring a variation of the first air cleanliness and the second air cleanliness; calculating a weight that is proportional to the variation of the first air cleanliness and the second air cleanliness; and setting a driving mode for the first air purifier and the second air purifier based on the weight.

11 Claims, 12 Drawing Sheets

(56) References Cited

U.S. PATENT DOCUMENTS

| | | | | |
|---|---|---|---|---|
| 2018/0154297 | A1* | 6/2018 | Maletich | ............... F24F 8/10 |
| 2019/0203959 | A1* | 7/2019 | Aleti | ............... G01N 33/0031 |
| 2019/0232210 | A1* | 8/2019 | Hur | ............... F24F 8/90 |
| 2021/0254853 | A1* | 8/2021 | Choi | ............... F24F 8/10 |

FOREIGN PATENT DOCUMENTS

| | | |
|---|---|---|
| KR | 101591735 | 2/2016 |
| KR | 101975319 | 4/2019 |

OTHER PUBLICATIONS

Korean Intellectual Property Office Application Serial No. 10-2019-0077201, Notice of Allowance dated Apr. 8, 2021, 2 pages.

* cited by examiner

SMART AIR PURIFIER SYSTEM WITH FIRST AND SECOND AIR PURIFIERS AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Patent Application No. 10-2019-0077201, filed on Jun. 27, 2019, the contents of which are hereby incorporated by reference herein in its entirety.

BACKGROUND OF THE INVENTION

Field Of The Invention

The present invention relates to a smart air purifier and a method for controlling the same, and more particularly to a smart air purifier capable of improving an air cleaning ability and a method for controlling the same.

Related Art

An air purifier has a function of removing particulate matters and hazardous matters in the air to thereby purify the air.

In a large public space such as a multiplex, multiple air purifiers may be used to improve an air purifying ability. In general, each air purifier is individually driven depending on an air quality of an area in which a corresponding air purifier is placed. Accordingly, an air purifying ability for the entire space is degraded and it is difficult to securing uniformity of air quality.

SUMMARY OF THE INVENTION

The present invention aims to solve the above problem.

The present invention aims to provide a method for efficiently controlling multiple air purifiers.

The present invention aims to provide a method for controlling air quality uniformly in a large space.

In one general aspect of the present invention, a method for controlling a smart air purifier includes: obtaining first air cleanliness of a first area in which a first air purifier is placed, and obtaining second air cleanliness of a second area in which a second air purifier is placed; when at least one of the first air cleanliness or the second air cleanliness is equal to or smaller than a preset threshold value, driving both the first air purifier and the second air purifier; monitoring a variation of the first air cleanliness and the second air cleanliness; calculating a weight that is proportional to the variation of the first air cleanliness and the second air cleanliness; and setting a driving mode for the first air purifier and the second air purifier based on the weight.

The driving of the first and second air purifiers may include randomly changing the driving mode at a predetermined time interval.

The monitoring of the variation of the first air cleanliness and the second air cleanliness may include matching the driving mode and a state of the air cleanliness at the predetermined time interval.

The method may further include, after the monitoring of the variation of the first air cleanliness and the second air cleanliness, terminating driving of the first and second air purifiers when all of the first and second air cleanliness reaches the preset threshold value.

The calculating of the first weight and the second weight may include, when the driving of the first air purifier and the second air purifier is terminated, distributing all preset weights to driving modes for the first air purifier and the second air purifier, and assigning all the preset weights to the driving modes in proportion to the variation of the first air cleanliness and the second air cleanliness.

The setting of the driving mode for the first air purifier and the second air purifier may include: setting a driving mode matched to the weight having a greatest value as an optimal driving mode; and, when operation of the first air purifier and the second air purifier are determined, driving the first air purifier and the second air purifier in the optimal driving mode.

The driving of the first air purifier and the second air purifier in the optimal driving mode may be followed by operation which includes: monitoring the variation of the first air cleanliness and the second air cleanliness; and when the variation of the first air cleanliness and the second air cleanliness is smaller than the preset threshold value, updating the optimal driving mode.

The updating of the optimal driving mode may include: varying a driving mode for the first air purifier and the second air purifier at an predetermined time interval; obtaining air cleanliness at the predetermined interval; matching the first air cleanliness and the second air cleanliness at a timing corresponding to the driving mode; setting a weight proportional to the air cleanliness; and updating the driving mode matched to the greatest weight as an optimal driving mode.

The method may further include receiving, from a network, Downlink Control Information (DCI) used for scheduling transmission of the first air cleanliness and the second air cleanliness, and the first air cleanliness and the second air cleanliness may be transmitted to the network based on the CDI.

The method may further include performing an initial access procedure with the network based on a Synchronization Signal Block (SSB), the first air cleanliness and the second air cleanliness may be transmitted to the network through a Physical Uplink Shared Channel (PUSCH), and the SSB and a Demodulation Reference Signal (DM-RS) of the PUSCH may be quasi co-located with QCL type D.

In another general aspect of the present invention, a smart air purifier includes: a sensing unit configured to sense first air cleanliness of a first area; an air cleaning unit configured to perform an air purifying function; and a controller configured to control driving of the air cleaning unit according to a driving mode.

The controller may be configured to vary the driving mode at a predetermined time interval when at least one of the first air cleanliness of the first area or second air cleanliness of a second area neighboring the first area is equal to or smaller than a preset threshold value.

The controller may be configured to: monitor a variation of the first air cleanliness and the second air cleanliness at the predetermined time interval; and calculate a weight that is proportional to the variation of the first air cleanliness and the second air cleanliness.

The controller may be configured to: calculate a weight for each driving mode in proportion to the variation of the first air cleanliness and the second air cleanliness by distributing all preset weights to driving modes for the first air purifier and the second air purifier, and set a driving mode having a greatest weight as an optimal driving mode.

The controller may be configured to, while the first air purifier and the second air purifier are driven in the optimal driving mode, updating the optimal driving model when the variation of the first air cleanliness and the second air cleanliness is smaller than a preset predicted variation.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
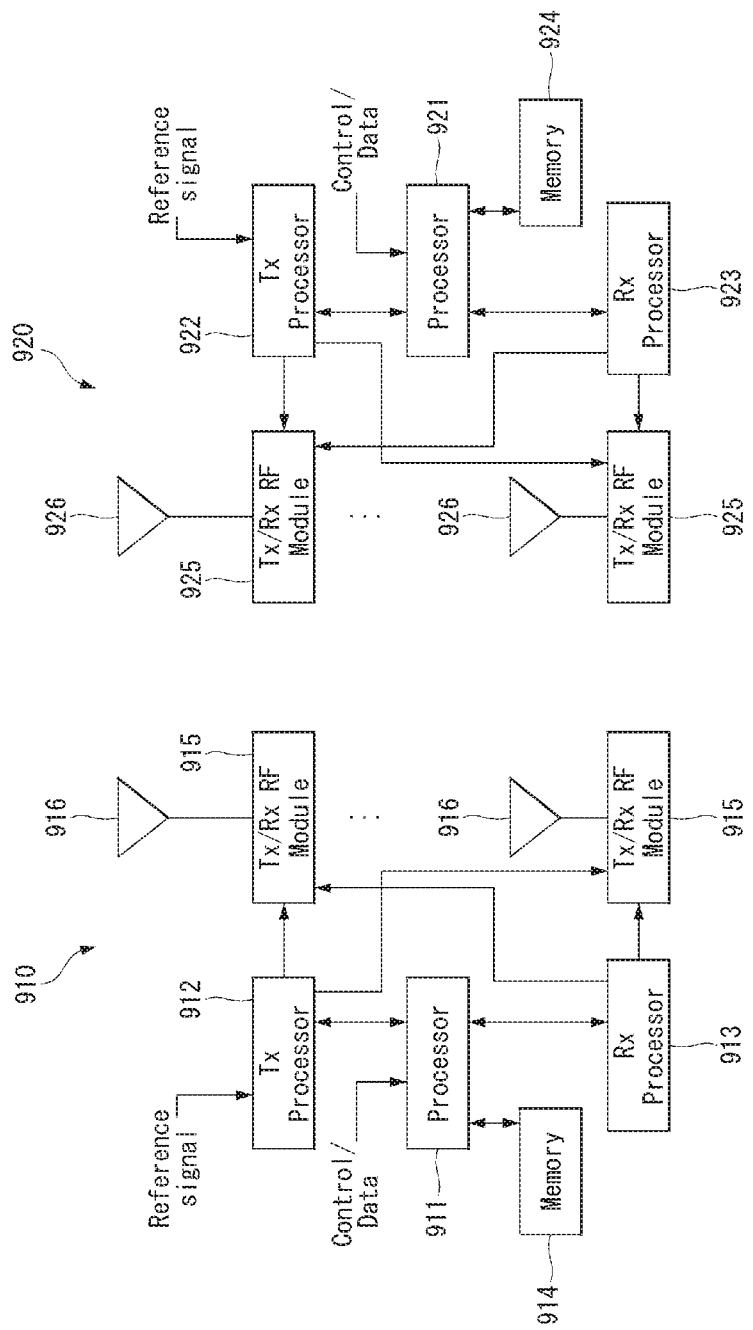
FIG. 1 shows an example of a block diagram of a wireless communication system to which methods proposed by the present specification is applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device(AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System.

Figure 2:
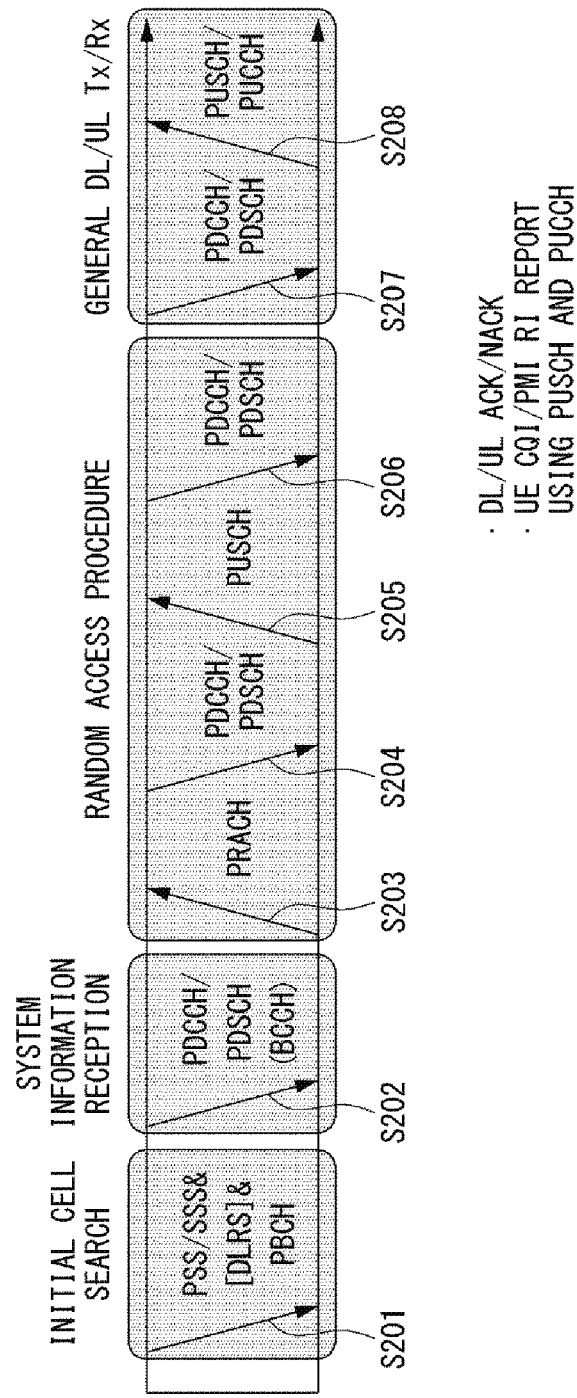
FIG. 2 is a diagram showing an example of a method of transmitting and receiving signals in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

Figure 3:
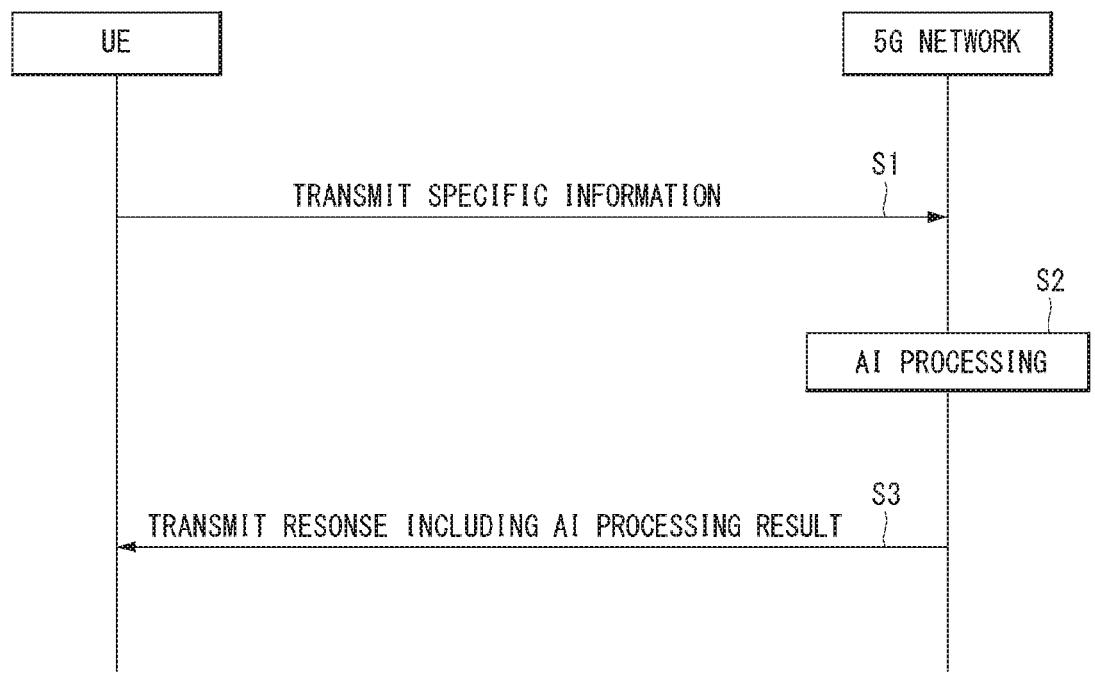
FIG. 3 shows an example of basic operations of a user terminal and a 5G network in a 5G communication system.

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Smart Air Purifier System

Figure 4:
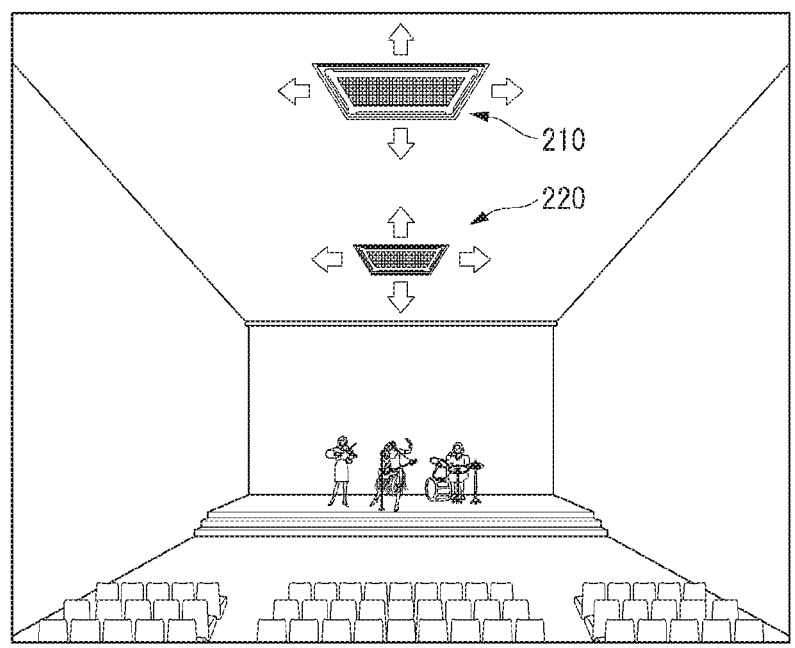
FIGS. 4 and 5 are diagrams showing a smart air purifier system according to an embodiment of the present invention.
Figure 5:
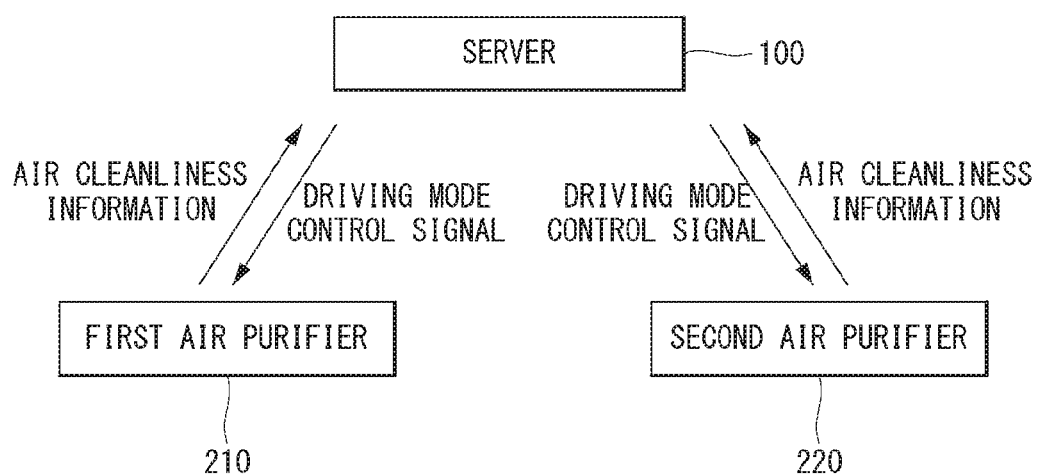

FIGS. 4 and 5 are diagram showing a smart air purifier system according to an embodiment of the present invention.

Referring to FIGS. 4 and 5, a smart air purifier system according to an embodiment of the present invention includes multiple air purifiers 210 and 220 and a server 100.

A first air purifier 210 senses air quality in a first area and obtains first air cleanliness based on the sensed information. A second air purifier 220 senses air quality in a second area and obtains second air cleanliness based on the sensed information.

The server 100 determines whether to drive the first air purifiers 210 and the second air purifier 220, based on air cleanliness provided from the first air purifiers 210 and the second air purifier 220. In particular, the server 100 updates an optimal driving mode by training the air cleanliness and driving modes. In addition, the server 100 controls a driving mode for the first air purifiers 210 and the second air purifier 220.

Although FIGS. 4 and 5 show an example of an operation method of the first air purifiers 210 and the second air purifier 220, the number of air purifiers is not limited thereto.

Figure 6:
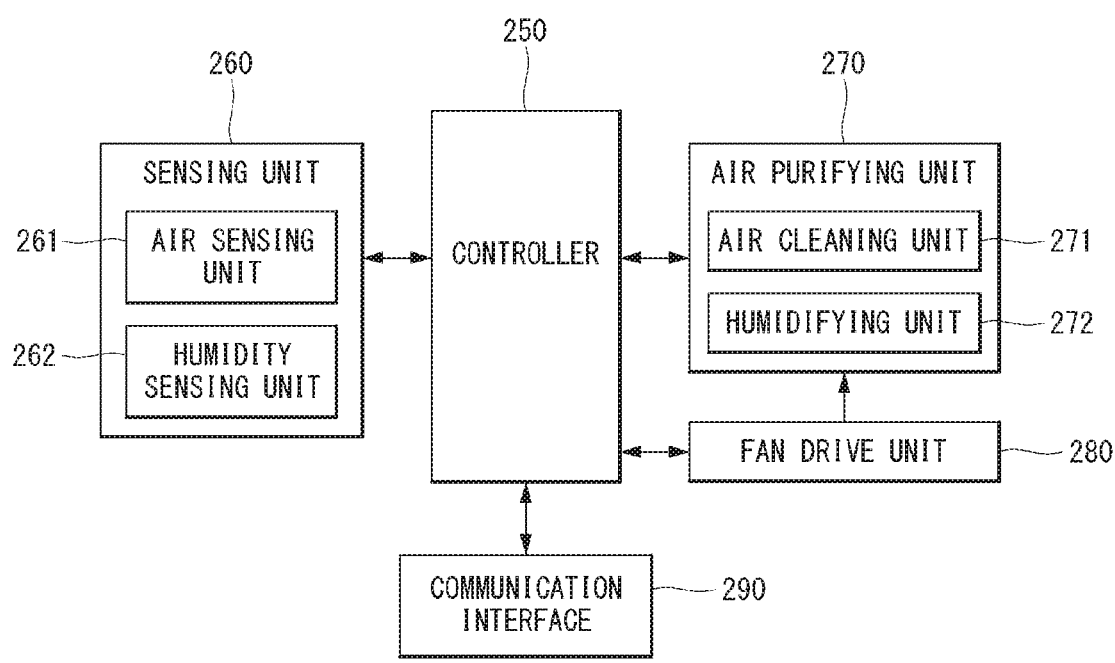
FIG. 6 is a block diagram showing a configuration of an air purifier according to an embodiment of the present invention.

FIG. 6 is a block diagram showing a configuration of an air purifier according to an embodiment of the present invention. The block diagram shown in FIG. 6 corresponds to an internal configuration of the first air purifier 210 or the second air purifier 220.

Referring to FIG. 6, an air purifier according to an embodiment of the present invention includes a controller 250, a sensing unit 260, an air purifying unit 270, and a communication interface 290.

The controller 250 controls operations of overall configuration of the air purifier. Based on a sensing value obtained by the sensing unit 260, the controller 250 may calculate air cleanliness and calculate additional information such as humidity and the like. Air cleanliness information indicates a level of how air is clean and may be represented as a number disproportional to an amount of particulate matters or hazardous matters in the air. The controller 250 may perform an air purifying function by controlling a fan drive unit 280 and the air purifying unit 270.

In addition, the controller 250 may perform a function of the server 100. That is, when at least one of air cleanliness of a first area or air cleanliness of a second area neighboring the first area is equal to or lower than a preset threshold value, the controller 250 may operate the air purifying unit 270 while varying the driving mode at a predetermined time interval.

The controller 250 may monitor a variation of first air cleanliness and second air cleanness at the predetermined time interval, and calculate a weight that is proportional to the variation of the first air cleanliness and the second air cleanliness.

In addition, the controller 250 may distribute all preset weights to driving modes for the first air purifier and the second air purifier to be proportional to the variation of the first air cleanliness and the second air cleanliness, and set a driving mode having the greatest weight as an optimal driving mode.

While driving the first air purifier and the second air purifier in the optimal driving mode, the controller 250 may update the optimal driving mode when the variation of the first air cleanliness and the second air cleanliness is smaller than a preset predicted variation.

An example of a method for controlling a driving mode by the server 100 or the controller 250 will be described later on.

The sensing unit 260 may sense air quality and may include an air sensing unit 261 and a humidity sensing unit 262 for this purpose. The air sensing unit 261 senses particulate matters, hazardous matters, or the like in the air. The humidity sensing unit 262 senses humidity in the air.

The air purifying unit 270 may perform an air purifying unit and an air humidifying unit. To this end, the air purifying unit 270 may include an air cleaning unit 271 and a humidifying unit 272.

The air cleaning unit 271 performs a function of purifying air in accordance with a control signal. Air purifying techniques may include a filter purification type, an ionization type, an electrostatic precipitation type, a water filter type, etc.

The filter type is a technique of suctioning air using a fan such as an electric fan and an air conditioner, purifying the suctioned air using a filter, and discharging the purified air again. An air purifier employing this technique collects and filters fine particles using a dense non-woven fabric filter such as HEPA and absorbs odor using active carbon. There is even a case in which the electrostatic precipitation type, which is a technique using "plasma effect" by electric discharge, is used together. In addition, a titanium dioxide photo catalyst may be employed instead of active carbon or ULPA denser than the HEPA may be employed.

The ionization type is a technique of discharging ions in the air by letting a high voltage flow to an electrode floating by a predetermined distance to thereby attach the ions to fine particles in the air and removing the fine particles by pulling the fine particles to a positive electrode precipitator.

The electrostatic precipitation is a technique of purifying polluted air using an electric precipitator having a strong collecting power by use of an electric discharge principle. The electrostatic precipitation type generally utilizes a fan, unlike the ionization type.

The water filter type is a technique of removing pollutants using absorptive strength of water by using water as a filter. The water filter type includes a product with collecting power, which is enhanced by adding an electric characteristic property to water, or use of water by showering the water.

The humidifying unit 272 humidifies air depending on a humidity obtained by the humidity sensing unit 262.

The fan drive unit 280 drives a fan included in the air cleaning unit 271 that is a filter type or the like.

The communication interface 290 may further include not just an element for receiving a signal/data from an external input, but also various additional elements such as a wireless communication module (not shown) for wireless communication and a tuner (not shown) for tuning a broadcast signal. The communication interface 290 may not just receive a signal from an external device but also transmit information/data/a signal to the external device. That is, the communication interface 290 is not limited to an element for receiving a signal from the external device and may be implemented as an interface that enables bidirectional communication. The communication interface 290 may receive a control signal for selecting a UI from multiple control devices. The communication interface 290 may be configured as a communication module of well-known short-range wireless communication such as Wi-Fi, Bluetooth, Infrared (IR) communication, Ultra Wideband (UWB), Zigbee, etc. or a mobile communication module of 3G, 4G, LTE, 5G, etc., or may be configured as a well-known communication port for wired communication. The communication interface 290 may be used not just for a control signal for selecting a UI, but also for other various purposes, such as transmission and reception of an instruction and data for manipulating a display.

Figure 7:
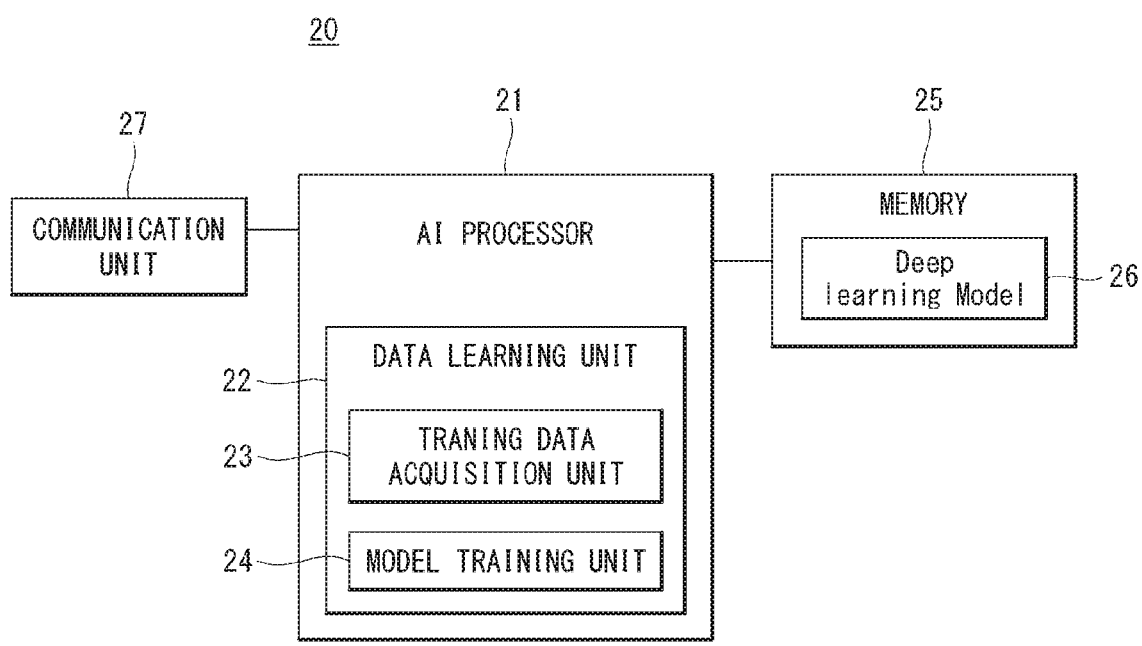
FIG. 7 is a block diagram of an artificial intelligence (AI) device according to an embodiment of the present invention.

FIG. 7 is a block diagram of an AI device according to an embodiment of the present invention.

An AI device 20 may include an electronic device including an AI module that can perform AI processing, a server including the AI module, or the like. Further, the AI device 20 may be included as at least one component of air purifier to perform together at least a portion of the AI processing.

The AI processing may include all operations related to a controller 250 of an air purifier. For example, the air purifier may perform processing/determination and control signal generation by performing AI processing on air cleanliness or humidity information.

The AI device 20 may be a client device that directly uses the AI processing result or may be a device in a cloud environment that provides the AI processing result to another device. The AI device 20, which is a computing device that can learn a neural network, may be implemented as various electronic devices such as a server, a desktop PC, a notebook PC, and a tablet PC.

The AI device 20 may include an AI processor 21, a memory 25, and/or a communication unit 27.

The AI processor 21 may learn a neural network using a program stored in the memory 25. In particular, the AI processor 21 may learn a neural network for recognizing related data of the washing machine 10. Here, the neural network for recognizing the related data of the washing machine 10 may be designed to simulate a human brain structure in a computer and include a plurality of network nodes having weights which simulate neurons of the human neural network.

Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

Operation Method of Smart Air Purifiers

Figure 8:
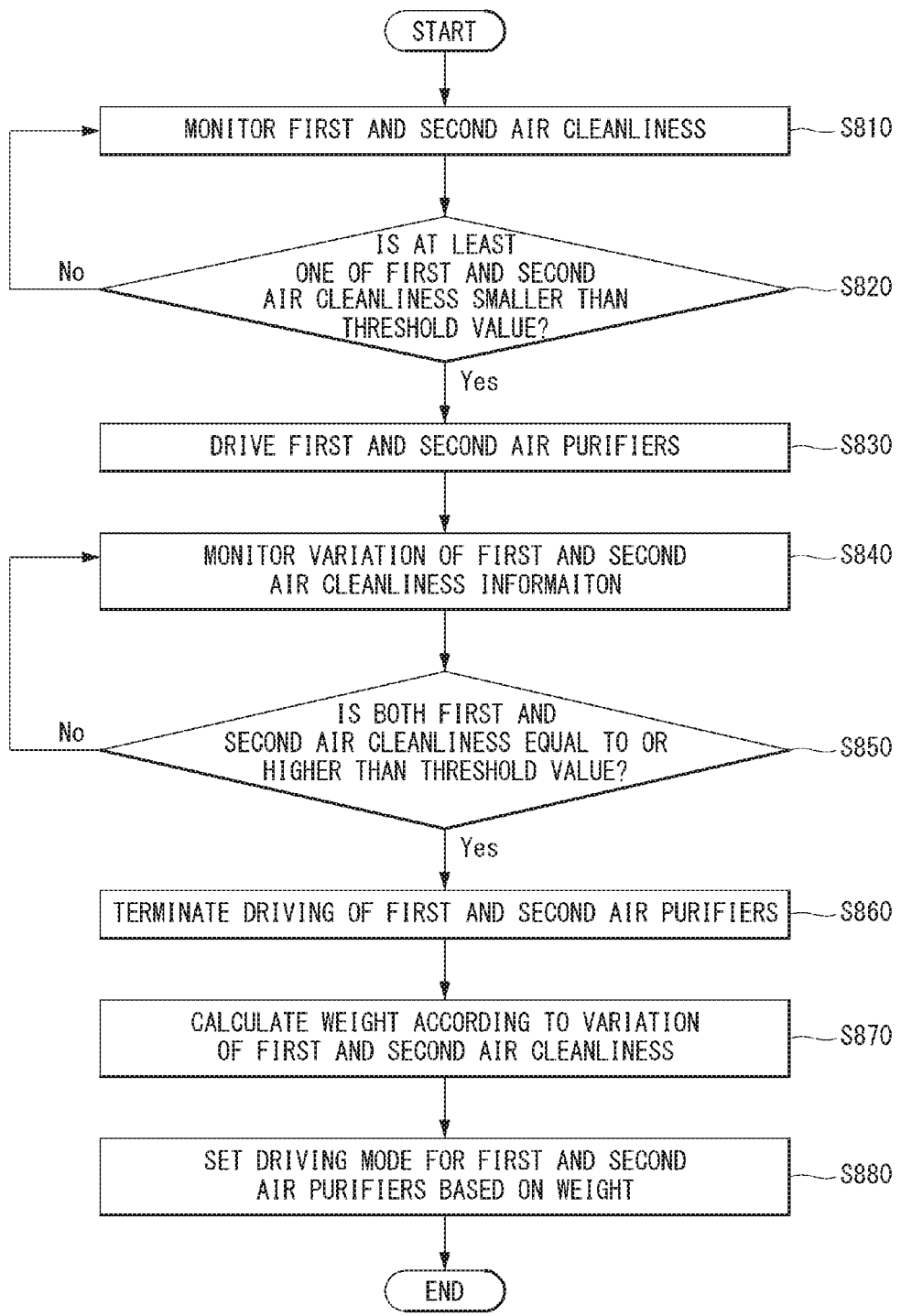
FIG. 8 is a flowchart of a method for operating air purifiers according to a first embodiment of the present invention.

FIG. 8 is a flowchart showing an operation method of air purifiers according to a first embodiment of the present invention.

Referring to FIG. 8, a plurality of air purifiers is preconditioned for the operation method of air purifiers according to a first embodiment of the present invention. The first embodiment of the present invention will be described mainly about an operation method of first and second air purifiers.

In a first step (S810), a first air cleanliness level and a second air cleanliness level are monitored.

Figure 9:
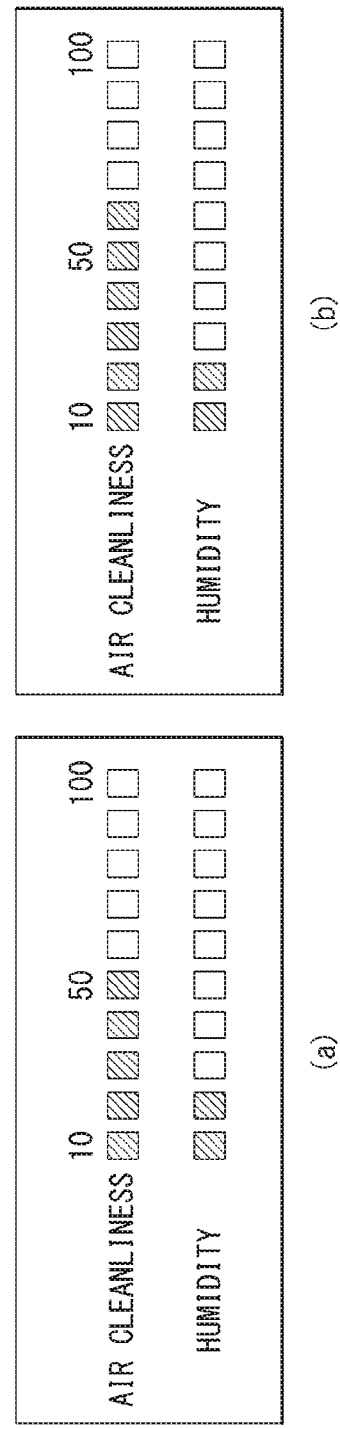
FIG. 9 is a diagram showing an example of air cleanliness achieved by air purifiers.

FIG. 9 is a diagram showing an example of air cleanliness levels achieved by air purifiers.

Referring to FIG. 9(a), the first air cleanliness corresponds to air cleanliness of a first area and may be obtained by a first air purifier 210. Referring to FIG. 9(b), the second air cleanliness corresponds to an air cleanliness of a second area and may be obtained by the second air purifier 220.

In a second step (S820), the server 100 compares each of the first air cleanliness and the second air cleanliness with a preset threshold value.

In a third step (S830), the server 100 may drive all of the first air purifiers 210 and the second air purifier 220 when at least one of the first air cleanliness or the second air cleanliness is level than the preset threshold value.

If air cleanliness of a specific area is degraded, a general air purifier or a control system for operating an air purifier drives only an air purifier placed in the specific area.

On the contrary, the server 100 according to an embodiment of the present invention drives a plurality of air purifiers when air cleanliness is degraded in some areas.

In a fourth step (S840) and a fifth step (S850), the server 100 monitors a variation of the first air cleanliness and the second air cleanliness and compares the variation with the threshold value.

In a sixth step (S680), the server 100 terminates driving of the first air purifier 210 and the second air purifier 220 when both the first air cleanliness and the second air cleanliness are equal to or greater than the threshold value.

In a seventh step (S870), the server 100 calculates a weight according to a driving mode for the first air purifiers 210 and the second air purifier 220. A weight is set to be proportional to air cleanliness according to each driving mode.

In an eighth step (S880), the server 100 sets a driving mode for the first air purifiers 210 and the second air purifier 220 according to the weight. The driving mode set in the eighth step (S880) may be applied to a next driving period of the first air purifiers 210 and the second air purifier 220.

Figure 10:
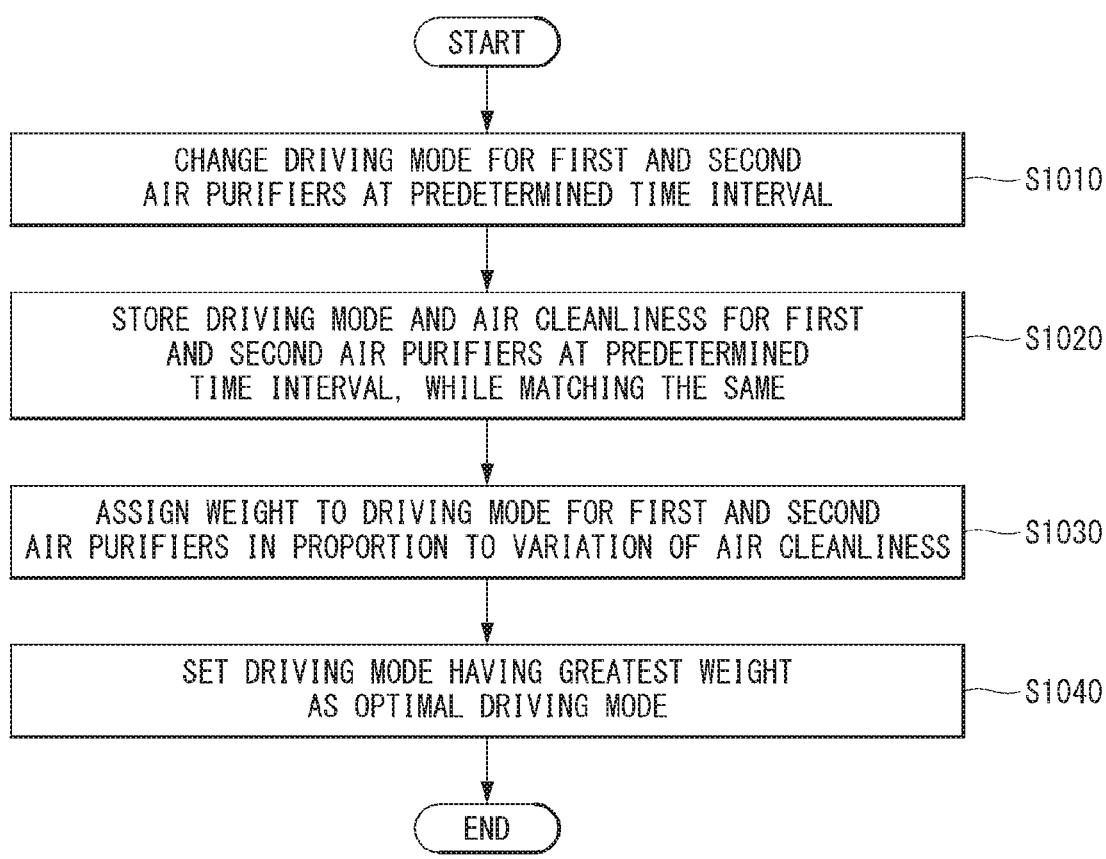
FIG. 10 is a flowchart showing an example of determining a weight of a driving mode.

FIG. 10 is a flowchart showing an example of determining a weight of a driving mode.

Referring to FIG. 10, the server 100 changes a driving mode for the first air purifiers 210 and the second air purifier 220 at a predetermined time interval in a first step (S1010).

Once the first air purifiers 210 and the second air purifier 220 starts to be driven in the third step (S830) of FIG. 8, the server 100 changes the driving mode for the first and second air purifiers 210 and 22 at the predetermined time interval. The driving mode may include intensity and direction of the first air purifiers 210 and the second air purifier 220. Table 1 shown below is a table showing an example in which the server 100 changes the driving mode.

TABLE 1

| Timing | Intensity | Direction |
|---|---|---|
| t1 | Strong | Direction 1 |
| t2 | Moderate | Direction 1 |
| t3 | Moderate | Direction 3 |

TABLE 1-continued

| Timing | Intensity | Direction |
|---|---|---|
| ... | ... | ... |
| t(n) | Week | Direction 2 |

The server 100 may set the same driving mode for the first air purifiers 210 and the second air purifier 220 or may control driving modes for the first air purifiers 210 and the second air purifier 220 individually. Thus, the driving modes shown in Table 1 may be applied to both the first air purifiers 210 and the second air purifier 220 or may be applied to any one air purifier. The directions shown in Table 1 may correspond to directions on a plane and may correspond to specific directions in a 3D space.

Referring to Table 1, the server 100 changes a driving mode of at least one of intensity or direction at each timing which comes at a predetermined unit of time. For example, at a first timing t1, the server 100 controls the intensity to "Strong" and controls the direction to "Direction 1". At a second timing t2, the server 100 may controls the intensity to "Moderate" and maintain the direction as "Direction 1". At a third timing t3, the server 100 may maintain the intensity as "Moderate" and change the direction to "Direction 3"

In order to control a driving mode, the server 100 may generate a control signal for controlling the fan drive unit 280 and the air cleaning unit 271 and transmit the control signal to the first air purifier 210 and the second air purifiers 220.

In a second step (S1020), the server 100 may store driving modes and air cleanliness of the first air purifiers 210 and the second air purifier 220 in association with each other. Table 2 as below is a table showing an example of matching driving modes and air cleanliness.

TABLE 2

| Timing | Intensity | Direction | Air Cleanliness |
|---|---|---|---|
| t1 | Strong | Direction 1 | 55 |
| t2 | Moderate | Direction 1 | 65 |
| t3 | Moderate | Direction 3 | 67 |
| ... | ... | ... | ... |
| t(n) | Weak | Direction 2 | 90 |

The first air purifier 210 or the second air purifier may obtain air cleanliness at a predetermined interval. The server 100 matches air cleanliness provided at each timing to a driving mode used at a corresponding timing. For example, the server 100 may match air cleanliness of a first area to a driving mode of the first air purifier 210, and match air cleanliness of a second area to a driving mode of the second air cleanliness.

In a third step (S1030), the server 100 assigns a weight to a driving mode for the first air purifiers 210 and the second air purifier 220 so that the weight can be proportional to corresponding air cleanliness. Table 3 as below is a table showing an example of assigning a weight.

TABLE 3

| Timing | Intensity | Direction | Air Cleanliness | Weight |
|---|---|---|---|---|
| t1 | Strong | Direction 1 | 55 | (+) 20 |
| t2 | Moderate | Direction 2 | 65 | (+) 4 |
| t3 | Moderate | Direction 3 | 68 | (+) 6 |

TABLE 3-continued

| Timing | Intensity | Direction | Air Cleanliness | Weight |
|---|---|---|---|---|
| ... | ... | ... | ... | ... |
| t(n) | Weak | Direction 2 | 90 | (+) 8 |

The server 100 may calculate a weight after driving of the first air purifiers 210 and the second air purifier 220 is terminated. That is, when air cleanliness of an air purifier in a first area and air cleanliness of an air purifier in a second area are equal to or greater than a threshold value, the server 100 may generate a control signal to terminate driving of the first air purifiers 210 and the second air purifier 220 and calculate a weight. Table 3 shows an example in which driving of the first air purifiers 210 and the second air purifier 220 is terminated when a threshold value is set to "90".

The server 100 may assign a weight to a driving mode for a predetermined time period so that the weight is proportional to a variation of air cleanliness in the corresponding predetermined time period. For example, the server 100 may assign a weight to a driving mode set at the first timing t1 according to a variation of air cleanliness from the timing t1 to the second timing t2.

That is, in a case where a variation of air cleanliness from the first timing t1 to the second timing t2 is 10 and a variation of air cleanliness from the second timing t2 to the third timing t3 is 2, the server 100 may assign a greater weight to a driving mode set at the first timing t1.

As such, the server 100 may calculate a weight for each driving mode by distributing all preset weights to driving modes for the first and second air purifiers.

In a fourth step (S1040), the server 100 sets a driving mode having the greatest weight as the optimal driving mode and update the optimal driving model in a database (not shown).

Figure 11:
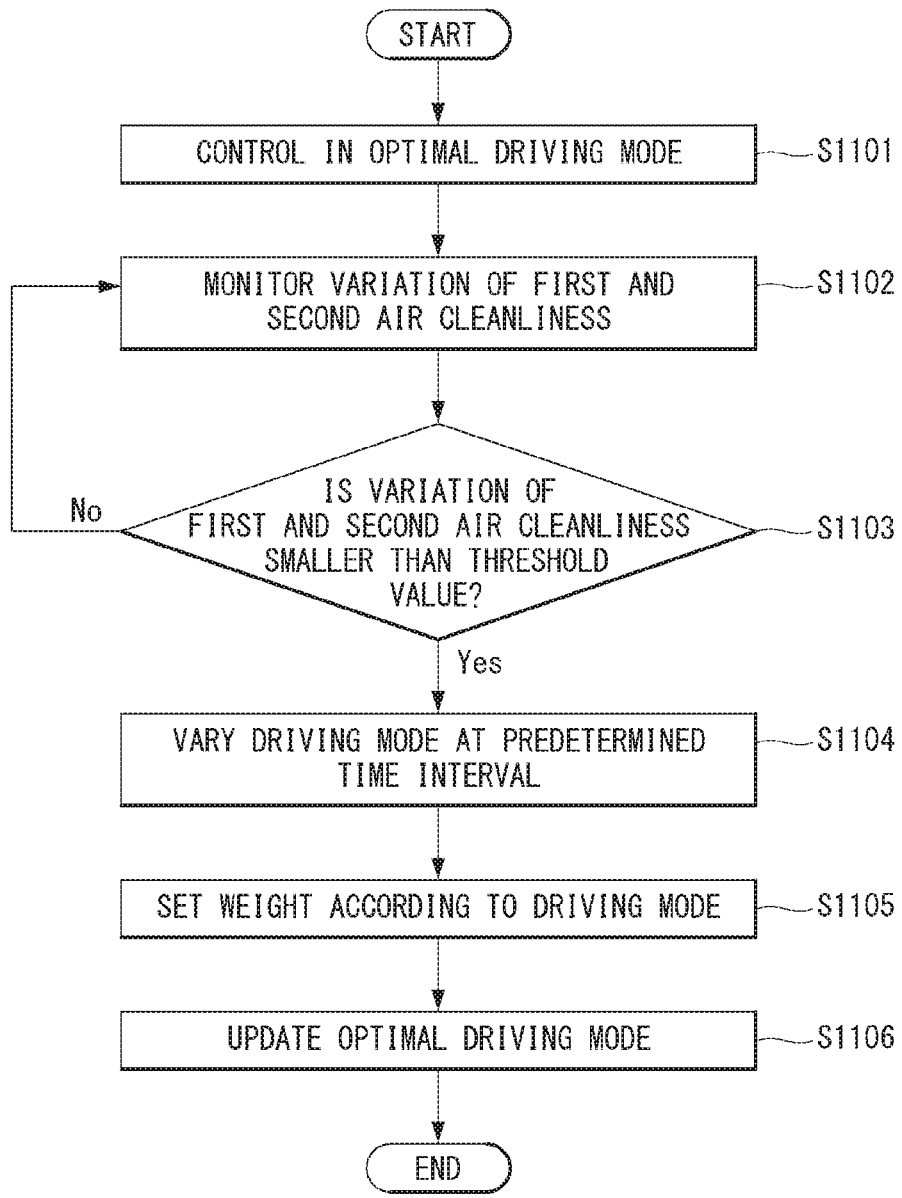
FIG. 11 is a flowchart showing a method for controlling an air purifier according to a second embodiment of the present invention.

FIG. 11 is a flowchart showing a method for controlling an air purifier according to a second embodiment of the present invention.

Referring to FIG. 11, the server 100 controls the first air purifiers 210 and the second air purifier 220 in the optimal driving mode in a first step (S1101). The first step (S1101) shown in FIG. 11 indicates a state in which the server 100 has determined to drive the first air purifiers 210 and the second air purifier 220 when air cleanliness achieved by the first air purifier 210 or the second air purifier 220 is equal to or smaller than a threshold value.

In a second step (S1102) and a third step (S1103), the server 100 monitors a variation of first air cleanliness and second air cleanliness and compares the variation with a preset threshold value. To this end, the first air purifiers 210 and the second air purifier 220 obtains first air cleanliness and second air cleanliness at a predetermined tine interval, and provides the first air cleanliness and the second air cleanliness to the server 100. The preset threshold value may be set to a variation of air cleanliness that is predicted when the first air purifiers 210 and the second air purifier 220 are driven in the optimal driving mode.

In a fourth step (S1104), the server 100 varies the driving mode for the first air purifiers 210 and the second air purifier 220 at the predetermined time interval when the variation of the first air cleanliness and the second air cleanliness is smaller than the preset threshold value. That is, when the first air cleanliness and the second air cleanliness are not purified as much as expected, the server 100 varies the driving mode for the first air purifiers 210 and the second air purifier 220 in order to update the optimal driving mode.

In a fifth step (S1105), the server 100 calculates a weight that is to be matched to a driving mode at the predetermined time interval. As a method for calculating a weight, the second step (S1020) and the third step (S1030) shown in FIG. 10 may be used.

In a sixth step (S1106), the server 100 resets a driving mode having the greatest weight as an optimal driving mode and updates the optimal driving mode.

Figure 12:
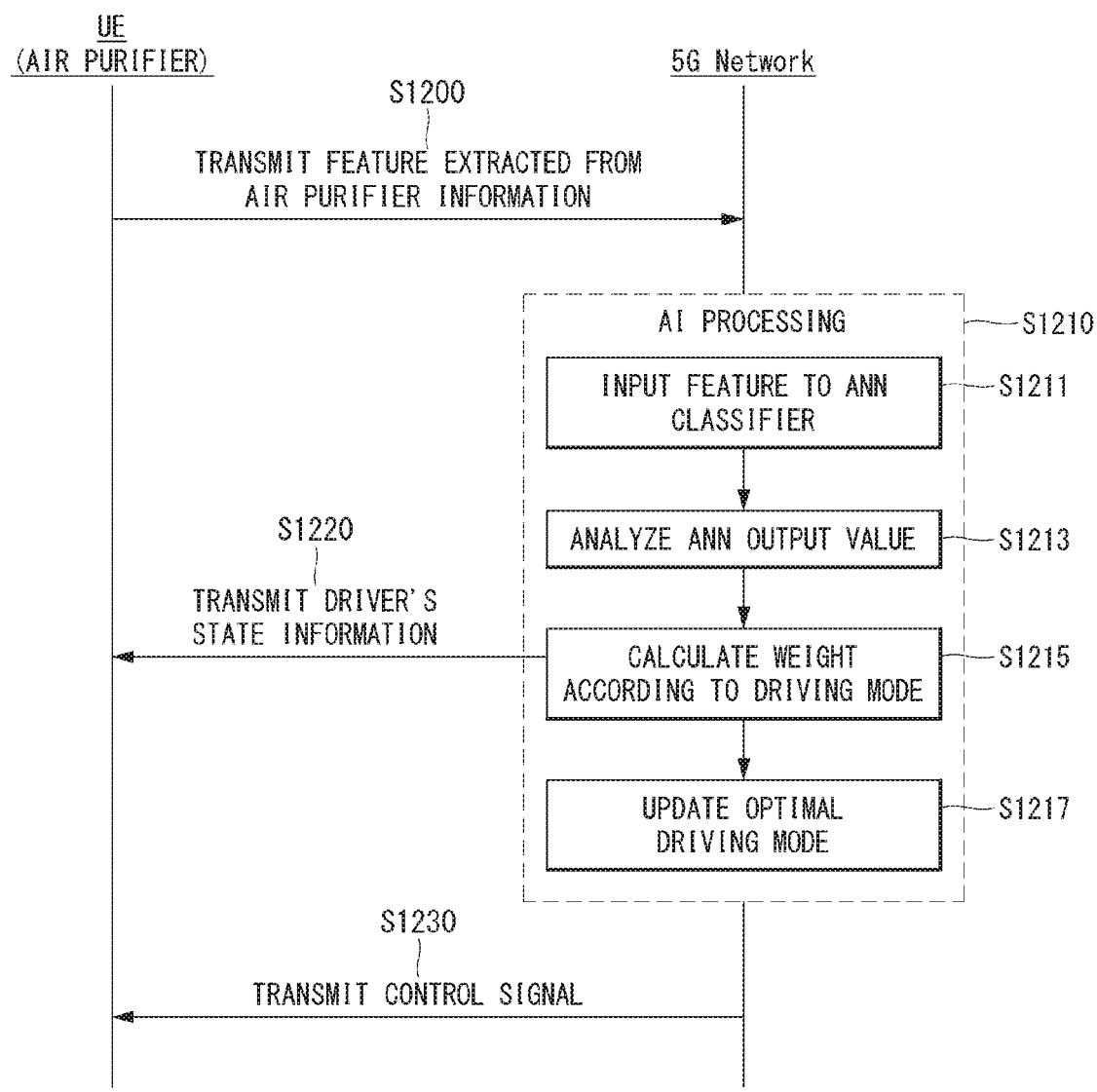
FIG. 12 is a diagram showing a method for controlling an air purifier according to a third embodiment.

FIG. 12 is a diagram showing a method for controlling an air purifier according to a third embodiment of the present invention.

Referring to FIG. 12, the controller 250 of each of the first air purifiers 210 and the second air purifier 220 may control a communication unit to transmit state information of the first air purifiers 210 and the second air purifier 220 to an AI processor included in a 5G network. In addition, the controller 250 may control the communication unit to receive AI-processed information from the AI processor.

Meanwhile, in order to transmit the state information of the first air purifiers 210 and the second air purifier 220 to the 5G network, the first air purifiers 210 and the second air purifier 220 may perform an initial access procedure with the 5G network. Based on a Synchronization Signal Block (SSB), the first air purifiers 210 and the second air purifier 220 may perform the initial access procedure with the 5G network.

In addition, the first air purifiers 210 and the second air purifier 220 may receive, from a network, Downlink Control Information (DCI), which is used for scheduling of transmission of air cleanliness information obtained by at least one sensor provided in the first air purifiers 210 and the second air purifier 220 through a communication interface.

The controller 250 may transmit air cleanliness information to the network based on the DCI.

The air cleanliness information may be transmitted to the network through a Physical Uplink Shared Channel (PUSCH), and the SSB and a Demodulation Reference Signal (DM-RS) of the PUSCH may be quasi co-located (QCL) with QCL type D.

Referring to FIG. 12, each of the first air purifiers 210 and the second air purifier 220 may transmit air cleanliness information or a feature extracted from the air cleanliness information to a 5G network.

Here, the 5G network may refer to an AI processor or an AI system, and the AI system of the 5G network may perform AI processing based on received sensing information (S1210).

The AI system may input a feature received from the first air purifiers 210 and the second air purifier 220 to an ANN classifier (S1211). The AI system may analyze an ANN output value (S1213), and calculate a weight based on the ANN output value (S1215). The 5G network may generate the optimal driving mode based on the weight calculated by the AI system, and update the optimal driving mode (S1217).

In addition, when driving the first air purifiers 210 and the second air purifier 220, the AI system may transmit a control signal corresponding to the optimal driving mode to the first air purifiers 210 and the second air purifier 220.

The embodiments shown in FIGS. 8 to 12 are described primarily about an embodiment in which a driving mode is set by a server or an AI processor, but the corresponding operation may be performed by a controller of an air purifier.

The configurations disclosed in the specification are to be construed in all aspects as illustrative and not restrictive. The scope of the invention should be determined by the appended claims and their legal equivalents, not by the above description, and all changes coming within the meaning and equivalency range of the appended claims are intended to be embraced therein.

According to the present invention, when air quality is downgraded even in a small area, multiple air purifiers are driven at the same time, thereby enabled to enhance the air cleaning ability in a large space.

In addition, as the multiple air purifiers are driven at the same time, the air quality of the large space can be maintained uniformly.

In particular, according to the present invention, weights for various driving modes can be calculated and an optimal driving mode having the best air cleaning ability can be determined based on the calculated weights, thereby allowing air to be rapidly purified in the large space.

What is claimed is:

1. A method for controlling a smart air purifier system, the method comprising:
   obtaining first air cleanliness of a first area in which a first air purifier is placed, and obtaining second air cleanliness of a second area in which a second air purifier is placed;
   when at least one of the first air cleanliness or the second air cleanliness is equal to or smaller than a preset threshold value, driving the first air purifier and the second air purifier;
   monitoring a variation of the first air cleanliness and the second air cleanliness;
   determining a first weight that is proportional to the variation of the first air cleanliness and a second weight that is proportional to the variation of the second air cleanliness; and
   setting a respective driving mode for the first air purifier and the second air purifier based on the determined first weight and the determined second weight, wherein the driving of the first air purifier and the second air purifier comprises randomly changing the respective driving mode at a predetermined time interval.

2. The method of claim 1, wherein the monitoring of the variation of the first air cleanliness and the second air cleanliness comprises matching the respective driving mode and a state of a corresponding air cleanliness at the predetermined time interval.

3. The method of claim 2, further comprising, after the monitoring of the variation of the first air cleanliness and the second air cleanliness, terminating driving of the first air purifier and the second air purifier when all of the first and second air cleanliness reaches the preset threshold value.

4. The method of claim 3, wherein the determining of the first weight and the second weight comprises, when the driving of the first air purifier and the second air purifier is terminated, distributing all preset weights to driving modes for the first air purifier and the second air purifier and assigning all the preset weights to the respective driving mode in proportion to the variation of the first air cleanliness and the second air cleanliness.

5. The method of claim 4, wherein the setting of the respective driving mode for the first air purifier and the second air purifier comprises:
   setting a driving mode matched to a weight having a greatest value as an optimal driving mode; and
   when operation of the first air purifier and the second air purifier are performed, driving the first air purifier and the second air purifier in the optimal driving mode.

6. The method of claim 5, wherein the driving of the first air purifier and the second air purifier in the optimal driving mode is followed by an operation which comprises:
   monitoring the variation of the first air cleanliness and the second air cleanliness; and
   when the variation of the first air cleanliness and the second air cleanliness is smaller than the preset threshold value, updating the optimal driving mode.

7. The method of claim 6, wherein the updating of the optimal driving mode comprises:
   varying a driving mode for the first air purifier and the second air purifier at a second predetermined time interval;
   obtaining the first air cleanliness and the second air cleanliness at the second predetermined time interval;
   matching the first air cleanliness and the second air cleanliness at a timing corresponding to the respective driving mode;
   setting a weight proportional to the first air cleanliness and the second air cleanliness; and
   updating the driving mode matched to the weight having the greatest value as the optimal driving mode.

8. The method of claim 1, further comprising receiving, from a network, Downlink Control Information (DCI) used for scheduling transmission of the first air cleanliness and the second air cleanliness,
   wherein the first air cleanliness and the second air cleanliness are transmitted to the network based on the DCI.

9. The method of claim 8, further comprising performing an initial access procedure with the network based on a Synchronization Signal Block (SSB),
   wherein the first air cleanliness and the second air cleanliness are transmitted to the network through a Physical Uplink Shared Channel (PUSCH), and
   wherein the SSB and a Demodulation Reference Signal (DM-RS) of the PUSCH are quasi co-located with quasi co-located (QCL) type D.

10. A smart air purifier system comprising:
    a sensing unit configured to sense a first air cleanliness of a first area and a second air cleanliness of a second area neighboring the first area;
    an air cleaning unit configured to perform an air purifying function, wherein the air cleaning unit comprises a first air purifier placed in the first area and a second air purifier placed in the second area; and
    a controller configured to:
    control driving of the first air purifier and the second air purifier according to a respective driving mode, and
    configured to vary the respective driving mode at a predetermined time interval when at least one of the first air cleanliness of the first area or the second air cleanliness of the second area is equal to or smaller than a preset threshold value, wherein the controller is further configured to:
    monitor a variation of the first air cleanliness and the second air cleanliness at the predetermined time interval,
    determine a weight that is proportional to the variation of the first air cleanliness and the second air cleanliness,
    determine a weight for each driving mode in proportion to the variation of the first air cleanliness and the second air cleanliness by distributing all preset weights to the respective driving mode for the first air purifier and the second air purifier, and set a driving mode having a greatest weight as an optimal driving mode.

11. The smart air purifier system of claim 10, wherein the controller is further configured to, while the first air purifier and the second air purifier are driven in the optimal driving mode, updating the optimal driving mode when the variation of the first air cleanliness and the second air cleanliness is smaller than a preset predicted variation.

* * * * *